Dec. 15, 1964 N. ROSE ETAL 3,161,728

COMMUNICATION NETWORK

Filed Dec. 18, 1961 2 Sheets-Sheet 1

INVENTORS
NED ROSE - HAROLD C. ROSE
BY S. Ruper Baker
ATTORNEY

Dec. 15, 1964 N. ROSE ETAL 3,161,728
COMMUNICATION NETWORK
Filed Dec. 18, 1961 2 Sheets-Sheet 2

INVENTORS
NED ROSE - HAROLD C. ROSE
BY
[signature]
ATTORNEY 3,161,728
Patented Dec. 15, 1964

3,161,728
COMMUNICATION NETWORK

Ned Rose, 636 Brooklyn Ave., and Harold C. Rose, 1648 E. 55th St., both of Brooklyn, N.Y.
Filed Dec. 18, 1961, Ser. No. 159,996
13 Claims. (Cl. 179—84)

The present invention relates generally to improvements in communication networks and it relates more particularly to a communications network including a master station and a plurality of substations wherein communication may be effected between said master station and one or more preselected substations. While the present invention will be described as applied to voice intercommunication, it is not intended to be so limited. The present communications network finds application in many other fields, such as in remote control, remote read out, instrumentation, automation and in other communication requirements.

In the conventional intercommunication system employing a master station and a plurality of remotely located substations, the speakers or transducers at the substations are simultaneously energized so that messages or conversations are heard at all the substations. This is a highly undesirable procedure since not only is privacy completely lacking but such a system requires the continued alertness at the various substations for at least part of the communication or message, which is highly distracting, tiring, and time consuming and invariably leads to inefficiencies. While many communication systems have been proposed for overcoming the above drawbacks, these possess many disadvantages and in most cases have not proven to be economically feasible.

It is therefore a principal object of the present invention to provide an improved communications network.

Another object of the present invention is to provide an improved network affording communication between a master station and one or more preselected substations.

Still another object of the present invention is to provide an improved network affording communication between a master station and one or more preselected substations in the absence of communication with any of the other of said substations.

A further object of the present invention is to provide an improved network affording communication between a master station and one or more preselected substations wherein a common channel or carrier is employed between said master station and said substations.

Figure 1:
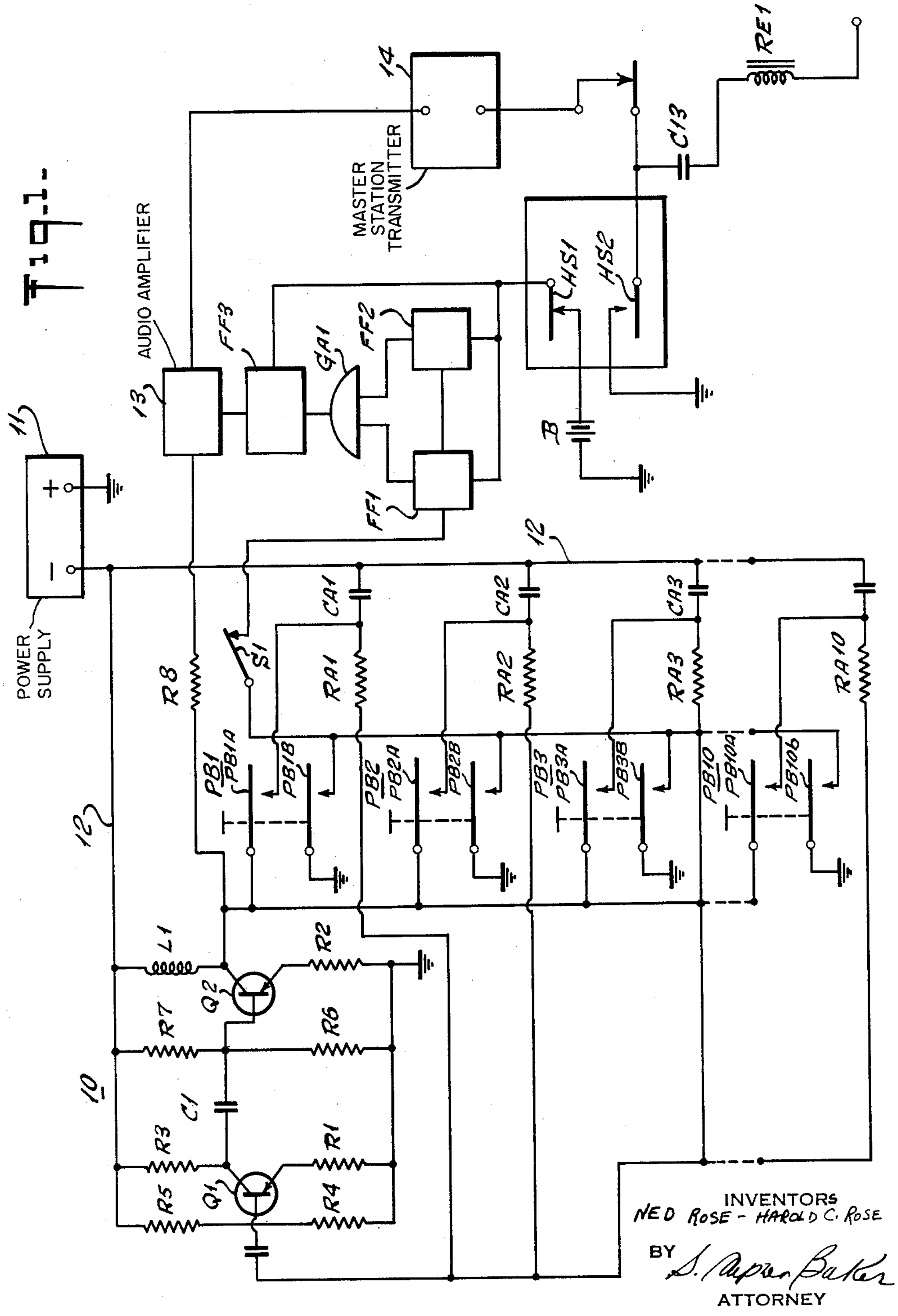
Figure 2:
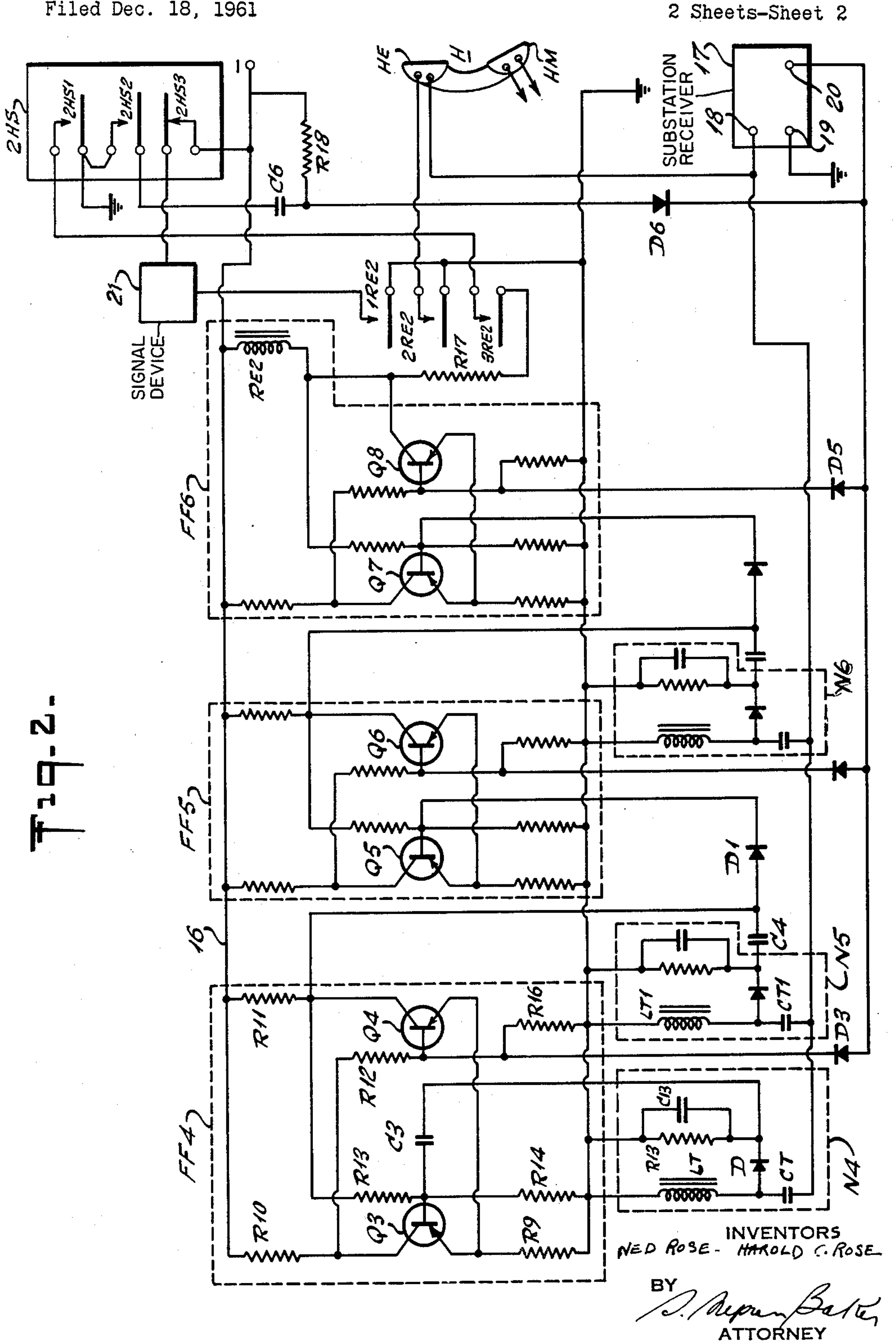

The above and other objects of the present invention will become apparent from a reading of the following description taken in conjunction with the accompanying drawings wherein:

FIGURE 1 is a schematic diagram of the selector network at the master station; and FIGURE 2 is a schematic diagram of the selector or coded network at a substation in accordance with the present invention.

In a sense, the present invention contemplates the provision of a signalling network comprising a master station including means for generating successive signals of different frequencies in a preselected sequence, a plurality of remote substations, a common channel connecting said remote substations to said master station, each of said remote substation comprising a first and at least one following flip-flop circuit switchable between an on and off state, means coupled to said common channel and responsive to a signal of a predetermined frequency for switching said first flip-flop circuit to an on state, means coupled to said common channel and responsive to the on state of a respective next proceeding flip-flop circuit and a signal of predetermined frequency on said common channel for switching a corresponding of said following flip-flop circuits, and means responsive to the state of the last flip-flop circuit.

According to a preferred form of the present invention, the signal generatng means includes a solid state multivibrator in which RC networks of different time constants are selectively inserted in the multivibrator feedback line to accordingly generate signals of correspondingly different frequencies. A scale of three networks is actuated upon the generation of each signal and disables the amplifier associated with the oscillator so as to prevent random multiple substation selections. The scale of three counter presupposes substations actuated by three successive signals and the counter is reset upon termination of the communication or selections.

The coded circuits at the remote substations include a plurality, for example three, transistor flip-flop circuits and the frequency responsive means associated with each of the flip-flop circuits is a series LC filter network. The output of the first filter network is rectified and integrated by a capacitor shunted by a leakage resistor and the capacitor voltage applied to the set terminal of the first flip-flop circuit. The following filter and rectifying networks are similar to the first except that their outputs are applied to the corresponding flip-flop circuit inputs in series with the next proceeding flip-flop circuit output so that only upon the switching of the proceeding flip-flop circuit to an on state is the next flip-flop circuit switched. The last flip-flop circuit actuates a relay to energize a signal device and enable the associated receiver. Means are provided at each substation for resetting the flip-flop circuits both upon raising of the associated hook carried handset or upon interruption of the carrier signal to the local receiver. It is important to note that although the embodiment of the present invention herein described employs an audio frequency modulated radio frequency carrier which may be wire or wireless coupled any other type of communication channel or carrier may be employed.

Referring now to the drawings and more particularly to FIGURE 1 thereof which illustrates the selector network at the master station the reference numeral 10 generally designates a transistor audio or tone oscillator which is of the multivibrator type provided with selectively insertible RC feed back lines for actuating the oscillator at corresponding selected frequencies. The oscillator 10 includes a pair of transistors Q1 and Q2, the emitters of which are grounded through resistors R1 and R2 respectively. A transistor power supply has its positive terminal grounded at its negative terminal connected to a negative line 12. The collector of transistor Q1 is connected to the negative line 12 by way of a load resistor R3 and to the base of transistor Q2 through a capacitor C1. The base of transistor Q1 is grounded through resistor R4 and connected to negative line 12 through resistor R5 and the base of transistor Q2 is grounded through resistor R6 and connected to negative line 12 through resistor R7. The collector of transistor Q2 is connected by way of inductor L1 to negative line 12 and through a resistor R8 to the input of an audio amplifier 13.

Associated with the oscillator 10 are a plurality of normally open double arm single throw push button switches PB1 to PB10, the arms PB1A to PB10A of which are connected to the collector of transistor Q2 and the other arms PB1B to PB10B of which are connected to ground. Also associated with the oscillator 10 are a plurality of RC networks including series connected resistors RA1 to RA10 and CA1 to CA10. The outer ends of capacitors CA1 to CA10 are connected to negative line 12, the outer ends of resistors RA1 to RA10 are interconnected and coupled through a capacitor C2 to the base of transistor Q1. The junction points of resistors RA1 to RA10 and CA1 to CA10 are each connected to a contact associated with a corresponding switch arm PB1A to PB10A. The values of the RC networks of RA and CA vary in the well known manner so that when they are inserted in the oscillator circuit by closing a corresponding switch PB the oscillator frequency varies, the oscillator frequency increment being, for example, 200 cycles per second, the frequency starting with RC circuit RA1–CA1 being 700 cycles per second and that with RA10–CA10 being 2500 cycles per second.

There is provided a scale of three counter including a pair of flip-flop circuits FF1 and FF2 the input terminal of flip-flop circuit FF1 being connected to the contacts associated with arms PB1B to PB10B of the pushbutton switches PB1 to PB10 and the input terminal of flip-flop circuit FF2 being connected to the reset pulse output of flip-flop circuit FF1. The outputs of flip-flops FF1 and FF2 are connected through an AND gate GA1 to the set terminal of a flip-flop circuit FF3 having a delayed output connected to disabling input terminal of the amplifier 13. The reset terminals of the flip-flop circuits FF1, FF2 and FF3 are connected by way of the normally closed hook switch HS1 and a battery B to ground. A normally closed switch S1 is located between the flip-flop circuit FF1 and the switches PB1 to PB10A to permit the disabling of the counting circuit and the continuous operation of the tone amplifier for the purpose which will be hereinafter set forth.

Mechanically, coupled to the switch HS1 is a normally open hook switch HS2 the contact of which is grounded and the arm of which is connected by way of the normally closed contacts of relay RE1 to the actuating terminal of the RF oscillator of the master station transmitter 14 and is also connected through a high capacity condenser C3 and the solenoid of relay RE1 to one terminal of a solenoid energizing power supply the other terminal of which is grounded. The switches HS1 and HS2 are operated by lifting the microphone and earphone hand set off the associated hook to open switch HS1 and close switch HS2. The output of the tone amplifier 13 as well as the associated microphone are connected to the audio input terminals of the transmitter and the earphone or associated loud speaker is connected to the master station receiver in the usual manner.

In FIGURE 2 of the drawings there is illustrated a frequency responsive decoding network associated with each of the substations, the decoding network including a plurality of flip-flop circuits FF4, FF5 and FF6, for example three, and tuned frequency responsive networks N4, N5 and N6 associated with corresponding flip-flop circuits FF4, FF5 and FF6 respectively. The flip-flop circuit FF4 includes a pair of transistors Q3 and Q4, the emitters of which are grounded through a common resistor R9. The collectors of transistors Q3 and Q4 are respectively connected through resistors R10 and R11 to line 16 connected to the negative terminal of a power supply, the positive terminal of which is grounded. The collector of transistor Q3 is connected to the base of transistor Q4 through resistor R12 and the collector of transistor Q4 is connected to the base of transistor Q3 through a resistor R13, and the bases of transistors Q3 and Q4, are grounded through resistors R14 and R16 respectively.

The frequency responsive network N4 includes the series connected inductor LT and capacitor CT, tuned to a predetermined frequency, the free end of inductor LT being grounded and the free end of the capacitor CT being connected to the audio output terminal 18 of the substation receiver 17, the other terminal 19 of the audio output thereof being grounded. The receiver 17 is provided with a conventional squelch circuit having a positive disabling output pulse which is available at a terminal 20. The junction point of the LT–CT network is connected through a diode D in series with a capacitor CB shunted by a resistor RB to ground and through the diode D and a series connected capacitor C3 to the base of transistor Q3. It should be noted that in the normal zero or off condition of the flip-flop circuit the transistor Q3 is conducting and transistor Q4 is at cut off. Upon an audio output signal from the receiver 17 at the frequency of the tuned network LT–CT, the capacitor CB is charged, increasing after a predetermined period of said signal, for example 300 milliseconds, to a voltage sufficient to switch the flip-flop circuit to its on state by the application of a positive cut-off signal to the base of the transistor Q3 through the coupling capacitor C3. The capacitors CB and C3, and the application of the switching signal to the conducting transistor Q3 serve to inhibit switching by noise and spurious signals.

The flip-flop circuit FF5 is similar to the flip-flop circuit FF4 and includes the normally conducting transistor Q5 and the normally cut off transistor Q6 and the associated resistor network. Furthermore, the frequency responsive network N5 is similar to the frequency network N4 and includes the series connected inductor LT1 and capacitor CT1, the resonant frequency of which is as earlier set forth and preferably differs from that of LT–CT. The output of the frequency responsive network N5 is coupled through a series connected capacitor C4 and diode D1 to the base of the transistor Q5 and the junction point of capacitor C4 and diode D1 is connected to the collector of transistor Q4. It should be noted that the parameters of the flip-flop circuits FF4 and FF5 and frequency responsive network N5 are selected in the well known manner that when the flip-flop circuit FF4 is in its off state and the transistor Q4 is non-conducting, the positive pulse received from the network N5 upon reception of a signal at the resonant frequency thereof from the receiver 17, is insufficient to switch the flip-flop network FF5 by reason of the high negative bias applied thereto. However, when the flip-flop circuit FF4 is in its on or set state and the transistor Q4 is conducting the negative bias is so reduced that the positive pulse from the network N5 is sufficient to switch the flip-flop circuit FF5.

The flip-flop circuit FF6 includes the normally conducting transistor Q7 and the normally non-conducting transistor Q8 and is likewise similar to the flip-flop circuit FF4 with the exception that the resistor R11 of flip-flop circuit FF4 is replaced by a relay solenoid RE2. Actuated by the relay solenoid RE2 are the normally open pairs of relay contacts 1RE2, 2RE2 and 3RE2. The frequency responsive network N6 is similar to the network N5 but preferably tuned to a different frequency and its output is coupled by way of a series connected capacitor C5 and diode D2 to the base of the transistor Q7, the junction point of the capacitor C5 and diode D2 being connected to the collector of transistor Q6. Here again, the parameters of the networks FF6 and N6 are so chosen that the flip-flop network FF6 is switched only when the flip-flop circuit FF5 is in its on state and a signal of the tuned frequency and of sufficient duration is delivered to the network N6 by the receiver 17.

The bases of the transistors Q4, Q6 and Q8 are respectively connected through diodes D3, D4 and D5 to the squelch circuit output terminal 20 of the receiver 17. Thus, upon a discontinuance of the reception by the receiver 17 of the RF carrier signal, a positive signal appears at the output terminal 20 and applied to the bases of the transistors Q4, Q6 and Q8 to render these transistors non-conducting and reset those flip-flops circuits which are in an on state.

Associated with each of the receivers is a handset H and a hook switch 2HS which releasably holds the handset H and includes normally open contacts 2HS1 and 2HS2 and normally closed contacts 2HS3 which are switched to their opposite positions upon raising of the handset H. The handset H includes the usual microphone HM and earphone HE, the microphone HM being connected in the usual manner to the transmitter section of the receiver 17. An electrically energized signal device 21 such as a buzzer or the like has one terminal thereof grounded through the normally open relay contacts 1RE2 and the other terminal connected through the normally closed hook switch contacts 2HS3 to the power supply negative terminal. The terminal of relay solenoid RE2 connected to the collector of transistor Q8 is coupled to ground through the series connected resistor R17, normally open relay contacts 3RE2 and normally open hook switch contacts 2HS1. A series connected capacitor C6 and resistor R18 have their junction point connected through a diode D6 to the reset line connected to the squelch signal output terminal 20, the outer terminal of the capacitor C6 being grounded through hook switch normally open contacts 2HS2 and the outer end of the resistor R18 being connected to the power supply negative terminal. The earphone HE is connected to the audio output terminals of the receiver 17 by way of the relay normally open contacts 2RE2. It should be noted that the receiver 17 is of the conventional transmit and receive type and is provided with a squelch circuit as aforesaid.

Considering now the operation of the improved networks described above, the circuits, in their inactive condition, are in the state illustrated in the drawings. In selecting a substation from the master station, the operator raises the associated handset from the hook switch to thereby open contacts HS1 and close contacts HS2. The opening of contacts HS1 removes the reset voltage of battery B from the flip-flop circuit FF3 to permit the switching thereof. The closing of contacts HS2 momentarily grounds the transmitter RF oscillator to energize the same and shortly thereafter energizes the relay solenoid RE1 through the changing of capacitor C13 to open the associated relay contacts and deenergize the transmitter RF oscillator. Following the charging of the capacitor C13 the relay solenoid RE1 is deenergized and the relay contacts closed to energize the transmitter RF oscillator. This rapid on-off-on sequence of the RF oscillator results in a squelch circuit generated signal at the receiver terminal 20 which is applied to the reset terminals of the flip-flop circuits FF4, FF5 and FF6 thus assuring that these circuits at the various substations are in their off or reset conditions. The operator then momentarily successively depresses three selected pushbuttons PB1 to PB10 corresponding to a desired substation. The depressing of a pushbutton PB closes the corresponding contacts PBA and PBB. The closing of a contact pair PBA inserts an RA-CA network into the oscillator circuit to effect the oscillation thereof at a corresponding audio frequency which is amplified by the amplifier 13 and applied to the audio input of the transmitter 14. The closing of a contact pair PBB pulses the flip-flop circuit FF1 to switch it from its zero to its one state. Upon closing of the second and third contact pairs PBA corresponding audio tone signals are sent by the transmitter 14 as modulated RF signals. The closing of a second contact pair PBB pulses flip-flop circuit FF1 to switch it to its zero state and provide therefrom a pulse to flip-flop circuit FF2 to switch it to its set or one state. The closing of a third contact pair PBB again pulses flip-flop circuit FF1 to switch it to its one state, the outputs of the flip-flop circuits FF1 and FF2 when in their one states actuating the flip-flop circuit FF3 through the AND gate GA1 to effect the delayed switching thereof and the disabling of the amplifier 13 following the transmission of the third tone signal. Thus the depression of any pushbuttons PB following the third depression does not effect the transmission of any time signals until the flip-flop circuit FF3 has been reset.

At a substation matching the three successively transmitted tone signals Q5 illustrated in FIGURE 2, the first tone signal resonates the filter circuit LT–CT to charge the capacitor CB through the rectifier diode D. A positive signal derived from the sufficiently charged capacitor CB is applied to the base of the transistor Q3 by way of capacitor C3 to switch the flip-flop circuit FF4 to its on state and transistor Q4 to a conducting condition. As a consequence the negative bias established at the base of transistor Q5 by reason of the non-conducting condition of transistor Q4 is removed to permit the switching of the flip-flop circuit FF5. The second tone signal resonates the filter network LT1–CT1 of the frequency responsive network N5 to apply a positive signal to transistor Q5 and switch the flip-flop circuit FF5 thus enabling the switching of the flip-flop circuit FF6. Upon the reception of the third tone signal, the frequency responsive network applies a positive signal to the base of transistor Q7 switching the flip-flop circuit FF6. The switching of flip-flop circuit FF6 renders the transistor Q8 conducting to energize the solenoid relay RE2 and thereby close the relay contacts 1RE2, 2RE2 and 3RE2. It should be noted that to effect the switching of the flip-flop circuits FF4, FF5 and FF6, the tone signals must be sent in the proper sequence, resonate successively with the networks N4, N5 and N6 respectively and be of sufficiently long duration.

The closing of contacts 1RE2 energizes the signal device or buzzer 21 by connecting it through hook switch contacts 2HS3 to a source of current, the closing of relay contacts 2RE2 connects the earphone to the audio output of the receiver 17 by completing the circuit through ground, and the closing of relay contacts 3RE2 connects the relay solenoid RE2 to the open hook switch contacts 2HS1 through the resistor R17. Upon raising of the handset H the hook switches 2HS1 and 2HS2 are closed and 2HS3 opened. The closing of contacts 2HS1 connects one end of the relay solenoid RE2 to ground to maintain the solenoid energized, the closing of contacts 2HS2 applies a positive reset pulse to the flip-flop circuits FF4, FF5 and FF6 through diodes D3, D4, D5 and D6 and by means of the differentiating network C6–R18, and the opening of contacts 2HS3 opens the buzzer 21 energizing circuit. The selected substation is now in private communication with the master station since at the other substation, the relay contacts 2RE2 being open in the absence of the relay solenoid energization, the earphone is not connected to the receiver 17. Upon replacement of the handset H the hook switch contacts are returned to their initial positions, the opening of contacts HS1 opening the relay hold circuit and deenergizing the relay solenoid RE2 and returning the relay contacts to their initial position.

At the master station selector, following the termination of communication, the hook switch contacts HS1 and HS2 are returned to their initial closed and open positions respectively. The closing of switch HS1 applies a positive reset pulse to flip-flop circuit FF3 and the opening of contacts HS2 deenergizes the transmitter RF oscillator and stops transmission. As a result the squelch circuits at the various receivers are actuated to effect the resetting of the flip-flop circuits FF5, FF6 and FF7 as aforesaid. In the event that it is desired to communicate simultaneously with more than one substation, the switch S1 is opened and the sequential code signals for each selected station is transmitted by depressing corresponding pushbuttons PB1. If communication with all the substations is desired the switch S1 is opened and all the pushbuttons PB are simultaneously depressed. The number of possible selective substations is a function of the number of tone signals employed and number of flip-flop circuits and associated frequency responsive networks at each substation coded network.

While there has been described and illustrated a preferred embodiment of the present invention it is apparent that numerous alterations, omissions and additions may be made without departing from the spirit thereof.

What is claimed is:

1. A signalling network comprising a master station including means for generating successive signals of different frequencies in a preselected sequence, a plurality of remote substations, each of said remote substations including a first flip-flop circuit and at least one following flip-flop circuit, each of said flip-flop circuits including an input set terminal and an input reset terminal, a filter network associated with a corresponding one of each of said flip-flop circuits and including an input terminal and an output terminal, a common channel connecting said filter network input terminals to said master station, the output terminal of said first filter network being coupled to the set terminal of said first flip-flop circuit, means responsive to the signal at the output terminal of each of the respective following filter networks and the state of the next preceding flip-flop circuit for applying a signal to the set terminal of the corresponding flip-flop circuit, and means responsive to the state of the last of said flip-flop circuits for controlling an output device.

2. A signalling network comprising a master station including means for generating successive signals of different audio frequencies in a preselected sequence, a plurality of remote substations, a common channel connecting said remote substations to said master station, each of said remote substations comprising a first and at least one following flip-flop circuit switchable between and on and off state, means coupled to said common channel and responsive to a signal of a predetermined frequency for switching said first flip-flop circuit to an on state, means coupled to said common channel and responsive to the on state of a respective next preceding flip-flop circuit and a signal of predetermined frequency on said common channel for switching the corresponding flip-flop circuit, and means responsive to the state of the last flip-flop circuit for controlling an output device.

3. A signalling network according to claim 2 including means for switching said flip-flop circuit to their off state.

4. A signalling network comprising a master station including means for generating successive signals of different audio frequencies in a preselected sequence, a plurality of remote substations, a common channel connecting said remote substations to said master station, each of said remote substations comprising a first flip-flop circuit and at least one following flip-flop circuit, each of said flip-flop circuits including an input set terminal and an input reset terminal, means responsive to a first signal of predetermined audio frequency on said common channel for applying a signal to the set terminal of said first flip-flop circuit sufficient to switch said flip-flop circuit to a set state, means responsive to another signal of a predetermined audio frequency on said common channel and the set state of the next preceding flip-flop circuit for applying a signal to the set terminal of the following flip-flop circuit sufficient to switch said flip-flop circuit to its set state, and means responsive to the set state of the last of said flip-flop circuits for controlling an output device.

5. A signalling network according to claim 4 including means for applying a signal to said reset terminals sufficient to switch said flip-flop circuits to their reset state.

6. A signalling network according to claim 4 wherein said signal generating means comprises an oscillator circuit, a plurality of frequency determining networks and means for selectively inserting said frequency determining networks into said oscillator circuit whereby to actuate said signal generator at corresponding frequencies.

7. A signalling network according to claim 4 including means decoupling said signal generator following the generation of a predetermined number of signals.

8. A signalling network according to claim 4 wherein said master station includes a transmitter having a radio frequency oscillator and means momentarily energizing and deenergizing said radio frequency oscillator prior to the energizing thereof, and said substations each include a receiver provided with a squelch circuit actuated by the radio frequency signal from said radio frequency oscillator and having an output connected to said flip-flop circuit reset terminals.

9. A signalling network according to claim 4 wherein said frequency responsive means respond only to signals exceeding a predetermined duration.

10. A signalling network according to claim 4 wherein each substation includes a receiver having a squelch circuit and means connecting the output of said squelch circuit to said flip-flop circuit reset terminals.

11. A signalling network according to claim 4 wherein the said means responsive to said last flip-flop circuit includes a signal device.

12. A signalling network according to claim 4 including a receiver, an audio transducer, means including a normally open switch connecting said transducer to said receiver and wherein said means responsive to said last flip-flop circuit comprises means for closing said switch.

13. A signalling network according to claim 4 including means selectively actuatable at each of said substations for applying a reset signal to said flip-flop circuit reset terminals.

References Cited in the file of this patent

UNITED STATES PATENTS

| | | | |
|---|---|---|---|
| 2,811,708 | 10/57 | Byrnes et al. | 340—171 |
| 3,003,041 | 10/61 | Faulkner | 179—84 |
| 3,039,081 | 6/62 | Smith | 340—171 |
| 3,057,964 | 10/62 | Power | 179—84 |

ROBERT H. ROSE, *Primary Examiner.*